(12) United States Patent
D'Amato et al.

(10) Patent No.: US 9,198,014 B2
(45) Date of Patent: Nov. 24, 2015

(54) PROCESS AND APPARATUS FOR COOPERATING TRANSMISSION OF AN ALARM

(75) Inventors: Paolo D'Amato, Rome (IT); Pietro Porzio Giusto, Rome (IT)

(73) Assignee: Sisvel Technology S.R.L., None (TO) (IT)

( * ) Notice: Subject to any disclaimer, the term of this patent is extended or adjusted under 35 U.S.C. 154(b) by 220 days.

(21) Appl. No.: 14/002,343

(22) PCT Filed: Mar. 1, 2012

(86) PCT No.: PCT/IB2012/050961
§ 371 (c)(1),
(2), (4) Date: Sep. 13, 2013

(87) PCT Pub. No.: WO2012/117364
PCT Pub. Date: Sep. 7, 2012

(65) Prior Publication Data
US 2014/0011470 A1    Jan. 9, 2014

(30) Foreign Application Priority Data

Mar. 2, 2011   (IT) ............................. TO2011A0185

(51) Int. Cl.
| | |
|---|---|
| *H04M 11/04* | (2006.01) |
| *H04W 4/22* | (2009.01) |
| *G08B 25/00* | (2006.01) |
| *G08B 25/01* | (2006.01) |
| *G08B 25/10* | (2006.01) |
| *H04W 76/00* | (2009.01) |

(52) U.S. Cl.
CPC ............... *H04W 4/22* (2013.01); *G08B 25/004* (2013.01); *G08B 25/009* (2013.01); *G08B 25/014* (2013.01); *G08B 25/10* (2013.01); *H04W 76/007* (2013.01)

(58) Field of Classification Search
CPC .... H04W 4/22; H04W 76/007; G08B 25/004; G08B 25/009; G08B 25/014; G08B 25/10

USPC ........................................ 455/404.1; 370/338
See application file for complete search history.

(56) References Cited

U.S. PATENT DOCUMENTS

2004/0203563 A1* 10/2004 Menard ...................... 455/404.1
2005/0021622 A1*  1/2005 Cullen .......................... 709/204
(Continued)

FOREIGN PATENT DOCUMENTS

| CN | 2831286 Y | 10/2006 |
|---|---|---|
| EP | 0 811 959 A1 | 12/1997 |

(Continued)

OTHER PUBLICATIONS

Chinese Office Action dated Feb. 5, 2015, issued in CN Application No. 201280011013.89, filed Mar. 1, 2012.
(Continued)

*Primary Examiner* — Marcos Batista
(74) *Attorney, Agent, or Firm* — Workman Nydegger

(57) ABSTRACT

A process for transmitting at least one alarm signal from an alarmed apparatus to a PSAP (Public Safety Answering Point, 127), through a system composed of a plurality of cooperating apparatuses (101, 104, 108, 106, 116, 119, 111, 124, 122) includes at least one such alarmed apparatus (101) and at least one responding apparatus, the apparatuses being equipped at least with memory, a processor and a first radio system for direct reception/transmission, from apparatus to apparatus, of signals and data, and the plurality of cooperating apparatus including at least one apparatus (124, 122) equipped with components adapted to transmit the alarm signal to the PSAP (127). An apparatus is also described which is adapted to implement the above process.

25 Claims, 3 Drawing Sheets

(56) References Cited

U.S. PATENT DOCUMENTS

| | | | |
|---|---|---|---|
| 2009/0075625 A1* | 3/2009 | Jackson et al. | 455/404.1 |
| 2009/0201143 A1 | 8/2009 | McKenna et al. | |
| 2010/0110924 A1 | 5/2010 | Blum | |
| 2010/0309804 A1 | 12/2010 | Blum et al. | |

FOREIGN PATENT DOCUMENTS

| | | |
|---|---|---|
| EP | 2 065 863 A1 | 6/2009 |
| GB | 2 443 021 A | 4/2008 |
| JP | 2008311702 A | 12/2008 |
| WO | 2006/083931 A1 | 8/2006 |

OTHER PUBLICATIONS

International Search Report dated May 31, 2012, issued in PCT Application No. PCT/IB2012/050961, filed Mar. 1, 2012.

Alex Woo et al., *Taming the Underlying Challenges of Reliable Multihop Routing in Sensor Networks*, Proceedings of the International Conference on Embedded Networked Sensor Systems, New York, Nov. 5-7, 2003, pp. 14-27.

International Preliminary Report and Written Opinion dated Sep. 3, 2013, issued in PCT Application No. PCT/IB2012/050961, filed Mar. 1, 2012.

* cited by examiner

Fig. 2a

| Issue | Routes | | | | | | Radio section attenuations (dB) | | | Reliability | Delay (ms) | | Radio section quality | Apparatus type | Speed | Other data |
|---|---|---|---|---|---|---|---|---|---|---|---|---|---|---|---|---|
| I | 104 | 106 | | | | | 95 | | | 9 | 80 | 7 | | | | ... |
|   | 108 | | | | | | 96 | | | 9 | 80 | 7 | | | | ... |
| II | 104 | 108 | X | | | | 94 | 85 | | 9 | 160 | 7 | | | | ... |
|   | 104 | 116 | X | | | | 94 | 90 | | 8 | 160 | 7 | 8 | | | ... |
|   | 104 | 104 | X | | | | 94 | 98 | | 6 | 160 | 7 | 7 | | | ... |
|   | 108 | 116 | | | | | 97 | 90 | | 9 | 160 | 7 | 7 | | | ... |
|   | 108 | 120 | | | | | 97 | 92 | | 8 | 161 | 7 | 8 | | | ... |
|   |   |   | | | | | 97 | 90 | | 9 | 160 | 7 | 9 | | | ... |
| III | 104 | 106 | 111 | | | | 95 | 86 | 82 | 7 | 240 | 7 | 8 | 7 | | ... |
|   | 104 | 106 | 119 | | | | 95 | 86 | 79 | 8 | 240 | 7 | 8 | 9 | | ... |
|   | 108 | 116 | 119 | X | | | 96 | 91 | 85 | 7 | 241 | 7 | 8 | 8 | | ... |
|   | 108 | 116 | 124 | PSAP | | | 96 | 91 | 90 | 7 | 242 | 7 | 8 | 8 | | ... |
|   | 108 | 120 | | X | | | 96 | 85 | | | | 7 | 9 | | | ... |

Fig. 2b

| Issue | Routes | | | | | | Radio section attenuations (dB) | | | Reliability | Delay (ms) | | Radio section quality | Apparatus type | Speed | Other data |
|---|---|---|---|---|---|---|---|---|---|---|---|---|---|---|---|---|
| | 104 | 106 | 111 | | | | 95 | 86 | 82 | 7 | 240 | 7 | 8 | 7 | | ... |
| | 104 | 106 | 119 | | | | 95 | 86 | 79 | 8 | 240 | 7 | 8 | 9 | | ... |
| | 104 | 108 | X | | | | 94 | 90 | | 8 | 160 | 7 | 7 | | | ... |
| | 104 | 116 | X | | | | 94 | 98 | | 6 | 160 | 7 | 7 | | | ... |
| | 108 | 104 | X | | | | 97 | 90 | | 9 | 160 | 7 | 7 | 8 | | ... |
| | 108 | 116 | 119 | X | | | 96 | 91 | 85 | 7 | 241 | 7 | 8 | 8 | | ... |
| | 108 | 116 | 124 | PSAP | | | 96 | 91 | 90 | 7 | 242 | 7 | 8 | 8 | | ... |
| | 108 | 120 | | X | | | 96 | 85 | | | | 7 | 9 | | | ... |

PROCESS AND APPARATUS FOR COOPERATING TRANSMISSION OF AN ALARM

BACKGROUND OF THE INVENTION

1. Field of the Invention

The present invention relates to a process and an apparatus for transmitting alarm messages in emergency situations from apparatuses which, when in need, have no access to public telecommunications networks.

2. Present State of the Art

Sending alarms through telecommunications systems in order to signal emergency situations is a service that many national and international bodies hold in great consideration and to which they dedicate many resources, so much so that in 1990 a single European emergency call number (112) was defined for emergency calls.

As cellular telephony becomes more and more widespread, some initiatives have been taken for defining emergency call systems which, in the event of a road accident, allow the rescuers to be rapidly alerted. Regulations pertaining to contents and formats for data transmission have been defined, such as, for example, those relating to the geographic coordinates of the apparatus from which the call originates.

Modes of automatic emergency call generation by terminals equipped with suitable sensors have also been defined. Regulations about these matters have been defined at European level, for example, within the scope of the "eSafety Forum" platform for the so-called "ECalls" (Emergency Calls).

The emergency calls defined by the above-mentioned regulations may be generated in places where a fixed telephone line or cellular network coverage is available. Emergencies may however also happen in various places (closed premises, elevators, basements, ravines, mountainous areas, etc.), where fixed telephones or cellular network coverage are not always available. Therefore, although the percentage of people that bring with them a cellular telephone tends to reach 100% anywhere, the current telecommunications systems do not always allow signalling an emergency situation by means of a telephone call or message.

It is nonetheless important to take into account that within the range of a mobile telephone without cellular coverage there may be other apparatuses capable of receiving and transmitting messages. Many types of mobile apparatuses, in fact, use various reception/transmission systems, among which a few, such as Wi-Fi Direct, DECT, ZigBee and Bluetooth, allow establishing direct connections between two apparatuses without needing support from telecommunications networks. Many of the apparatuses equipped with such radio systems can also establish connections with public telecommunications networks, whether through said radio systems or through other systems, and therefore such apparatuses can be used as a bridge between an apparatus in emergency conditions and a public telecommunications network. In some regions of the world, terminals are available which are equipped with GSM, WCDMA, Wi-Fi and Bluetooth. In other regions, GSM is replaced by PHS or AMPS, and Wi-Fi may be replaced by DECT.

SUMMARY OF THE INVENTION

It is therefore an object of the present invention to overcome the above-mentioned problems of the prior art by providing a process for cooperative alarm transmission which allows an alarm signal to be sent from an apparatus having no access to public telecommunications networks, by exchanging messages (signals, commands or data) with other nearby apparatuses.

It is another object of the present invention to provide a process for cooperative alarm transmission which allows creating a chain of apparatuses like those mentioned above, through which an alarm message can travel from apparatus to apparatus until reaching a public telecommunications network, and then through the latter arrive at an emergency management centre.

It is a further object of the present invention to provide an apparatus which is adapted to implement the process according to the present invention.

These and other objects and advantages of the invention, which will become apparent from the following description, are achieved through a process for cooperative alarm transmission as set out in claim 1.

In addition, these and other objects and advantages of the invention are achieved through an apparatus as set out in claim 22.

Preferred embodiments and non-obvious variants of the present invention are specified in dependent claims.

It will become immediately apparent that what is described herein may be subject to innumerable variations and modifications (e.g. in shape, dimensions, arrangements and parts having equivalent functionality) without departing from the protection scope of the invention as set out in the appended claims.

BRIEF DESCRIPTION OF THE DRAWINGS

The present invention will be described in detail below through some preferred embodiments thereof, which are only provided by way of non-limiting example, with reference to the annexed drawings, wherein:

FIG. 2*a* shows an example of data evolution in the routing table;

FIG. 2*b* shows an example of a routing table comprising all the information acquired when implementing the alarm transmission process according to the present invention.

DETAILED DESCRIPTION OF THE PREFERRED EMBODIMENTS

Figure 1:
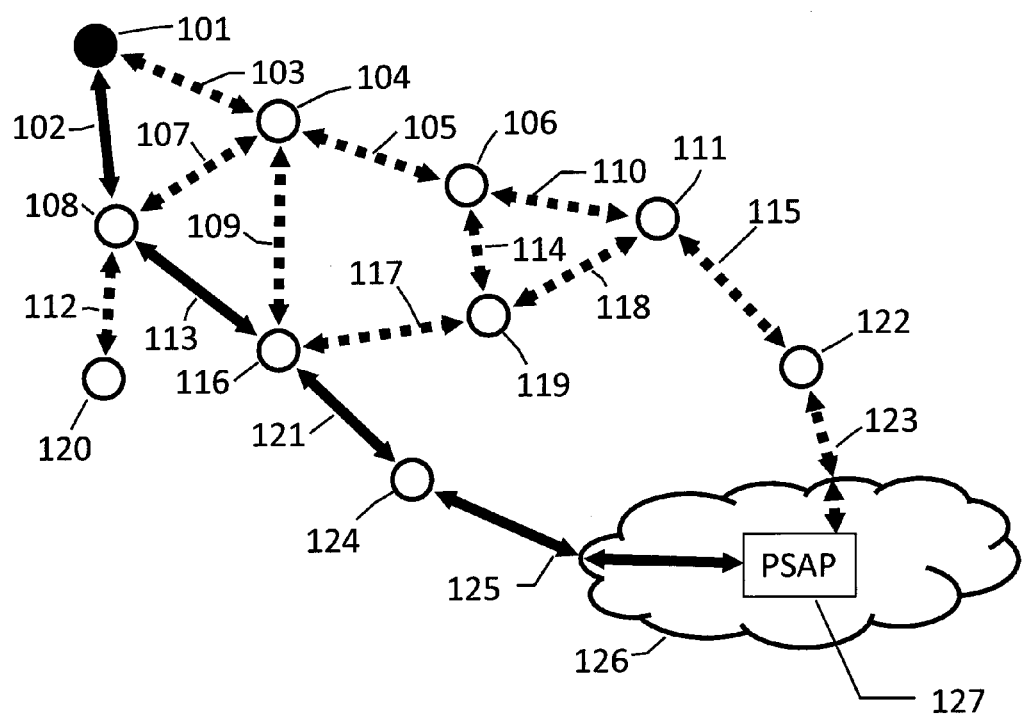
FIG. 1 is a diagram showing an exemplary implementation of a cooperative system according to the present invention for forwarding an alarm.

In the following description, the following names will be used, which are listed below with the corresponding definitions:

alarm: signalling of an emergency situation to be transmitted to a PSAP (see below);

cooperating apparatus: apparatus having such characteristics as to be able to cooperate in the transmission of said alarm;

alarmed apparatus: apparatus, possibly a cooperating apparatus, wherein the alarm is generated and which leads the process for transmitting said alarm;

transit apparatus: (cooperating) apparatus through which said alarm signal and other signals flow in transit;

exploring apparatus: (cooperating) apparatus commanded to issue an exploring signal upon reception of an exploring command (see below);

PSAP: Public Safety Answering Point, i.e. an emergency management centre;

emergency network: telecommunications network to which a PSAP is connected;

responding apparatus: apparatus responding to an exploring signal (see below);

exploring command: command issued ad hoc by the alarmed apparatus and addressed to an apparatus previously selected as an exploring apparatus;

exploring signal: signal broadcast by an apparatus acting as an exploring apparatus, requiring all apparatuses that receive it, regardless of whether the alarmed apparatus is aware a priori of the presence or existence of the latter, to acknowledge the reception thereof in order to locate any responding apparatuses which may be counted among the cooperating apparatuses;

response signal: signal through which a responding apparatus (see above) responds to an exploring signal;

information signal: signal possibly transmitted following said alarm, containing additional information about the alarmed apparatus and the event that generated the alarm;

route or routing chain (or sequence): succession of cooperating apparatuses through which the alarm can travel from one apparatus to the other until possibly reaching a PSAP;

routing table: table containing the routes and possibly also other characteristics of the radio sections that compose them.

Furthermore, the following symbols will be used in the following description and in the annexed drawings:

i: exploring level index, i.e. a progressive index of the steps of the alarm transmission procedure for widening the group of cooperating apparatuses;

N: generic number of times that a set of exploring commands of the same level is issued by the alarmed apparatus;

$N_E$: maximum allowable number of times that exploring commands of the same level are transmitted by the alarmed apparatus;

$t_a$=time variable indicating the time elapsed since the alarm was activated;

$T_A$: maximum duration of the alarm transmission process;

$T_E$: maximum waiting interval allowed between successive repetitions of a set of exploring commands or signals of the same level.

A preferred embodiment of the alarm transmission process according to the present invention will be described below by means of an explanatory example referring to the configuration shown in FIG. 1, wherein it can be seen that such a process is implemented through a system composed of a plurality of cooperating apparatuses according to the present invention, which comprises at least one alarmed apparatus 101, which, for example, has been alarmed following an emergency situation.

In particular, the apparatus according to the present invention is equipped with at least the following means:

at least one radio system for direct reception and transmission, from apparatus to apparatus, of messages (signals, commands and data);

memory means, in particular means for storing said routing table;

processing means for making attenuation and quality estimates, processing the data of said routing table, and performing all the necessary and optional steps required by the process of the present invention.

Possibly, the alarmed apparatus according to the present invention may be equipped with optional means comprising:

means for estimating the attenuation undergone by the received signals along the propagation path, in particular means of estimating the power of a signal picked up by the reception antenna and means for computing the ratio between a given (transmission) power value and said estimated power;

means for estimating the quality of the received signals: for example, a non-exhaustive and non-limiting list of parameters to be taken into account when estimating reception quality comprises: received signal power, signal-to-noise ratio, estimated error probability, radio channel distortions, radio channel variability.

In the following description, it will be generally assumed that the apparatuses are also equipped with said optional means, so as to fully illustrate the operation of the transmission process according to the present invention.

The transmission process according to the present invention starts upon manual or automatic activation of one or more switches or actuators present in the apparatus, or possibly upon dialling and calling the PSAP emergency number. Said activation initializes a measuring mechanism that detects the elapsed time, symbolically represented by the time variable $t_a$, which is reset at this initial step. Once said process has been started, if the alarmed apparatus cannot directly connect to the PSAP, it internally generates a first exploring command (referred to as first-level command), which only in this case is addressed to itself, so that it can act as a first and sole exploring apparatus, by virtue of which it radiates a first-level exploring signal through one or more reception/transmission systems, as will be explained hereafter, which allow establishing a direct connection between apparatuses. When the exploring signal is sent, a variable N is initialized, which counts the number of times that generic exploring commands of a certain level have been sent. Therefore, N=1 is set during this first step of the process.

The first-level exploring signal, as well as any generic exploring signal of any level, contains at least the following elements:

a) indication whether it is an emergency call to be forwarded to a PSAP;

b) identifier of the entity that generated the call, i.e. identifier of the alarmed apparatus;

c) identification code of the radiated signal, containing at least one order number of the exploring command and the identifier of the exploring apparatus radiating the signal.

In particular, the identification code of the radiated signal is included in the responses to the exploring signal in order to distinguish between responses to the exploring signal radiated by a given exploring apparatus at a given exploring level, and possibly to a given repetition of the exploring signal of said given exploring level, in this case of the first level, and possible responses to exploring signals from other exploring apparatuses or of a different level or possibly corresponding to different repetitions of the same exploring signal. As will be explained below, it may in fact happen that, due to various delays along different transmission paths, the responses to signals issued at a given instant arrive after those to signals issued at later times.

In general, therefore, the identification code of the exploring signal may contain the following information:

identifier of the exploring apparatus radiating the signal, current exploring level i, value N, which indicates the current index of repetition of the i-level exploration.

In a first embodiment, these three elements are distinctly contained in the exploring signal.

In a second embodiment, aiming at minimizing the volume of data contained in the exploring signal, the exploring apparatus combines the values of the exploring level i and of the repetition index N into a single numerical datum.

By way of non-exhaustive and non-limiting example of such a combination, every single exploring apparatus assigns a progressive number to the exploring signals it radiates according to an index k of its own, independently of the exploring level, but storing into a table of its own indexes k the exploring level i and the repetition level N corresponding to each value of the index k. Upon receiving a response to an exploring signal, the exploring apparatus rebuilds, from the value of the index k in the response and by referring to its table of indexes k, the exploring level i and the repetition index N corresponding to the exploring signal to which the response relates. The exploring apparatus then transmits to the alarmed apparatus the values of i and N, along with its own identifier and with the other data obtained from the response.

The exploring signal issued by the exploring apparatuses has no destination address, in that it is broadcast in order to be received by as many apparatuses as possible. It is therefore advantageous to send said exploring signal at the maximum radio power allowed by the radio system in use.

The first-level exploring signal may contain the power value used for radiating the first-level exploring signal, and all or some of the data of the MSD (Minimum Set of Data) specified by international or national standards, such as, for example, those described in document "CEN/TS 15722:2009 "Road transport and traffic telematics—eSafety—ECall minimum set of data (MSD)". In particular, the first-level exploring signal, as well as the higher-level ones, may possibly contain:

date and time of alarm issue;
latitude of the point where the alarmed apparatus is located;
longitude of the point where the alarmed apparatus is located;
direction of movement of the alarmed apparatus.

As an alternative, some data are transmitted by means of an information signal that follows the first-level exploring signal, possibly after having found the best route for sending the information to a PSAP.

In the example of FIG. 1 it is assumed that two apparatuses respond to said first-level exploring signal, said responding apparatuses being represented by the circles 104 and 108, respectively, and that each of said first responding apparatuses transmits to the alarmed apparatus an ad hoc first-level response signal specifically addressed thereto, which contains at least:

d) its own identifier;
e) identification code of the signal being responded to;
f) an alarm signal forwarding indication, indicating whether said alarm signal has been forwarded or not to a PSAP by the responding apparatus;
g) transmission power used for transmitting the first response signal.

In addition to the above information, the response signals responding to any subsequent exploring signals, as will be explained later on, may also contain information about the transit apparatuses and the radio sections belonging thereto.

The alarm signal forwarding indication corresponds to the condition wherein the responding apparatus is locked to a public telecommunications network capable of transmitting an alarm signal to a PSAP; in such conditions, the responding apparatus will immediately transmit the alarm signal to that PSAP. If said indication is negative, it is assumed that the responding apparatus cannot directly forward an alarm to an emergency network, but this does not exclude that the responding apparatus can establish, or has already established, connections to other apparatuses which may become cooperating apparatuses.

The first response signal may also contain the ratio between the power at which the first-level exploring signal has been transmitted (whose value may be included in the data transmitted in said first-level exploring signal) and the power at which the first-level exploring signal has been received. The indication given by this ratio may be combined with the similar ratio computed from the response signal to estimate the attenuation of the radio section and the variability thereof over time. The alarmed apparatus, in fact, receives the value of the power at which each response signal has been transmitted (see point g) above) and can measure the power level at which it receives the response signal. From the difference between the two power ratios and from the time elapsed between the emission of the first-level exploring signal and the reception of the corresponding response signal, one can obtain an indication as to the variability of the radio section travelled by said signals.

It will be apparent to those skilled in the art that similar indications may be obtained in relation to the radio sections through which other pairs of apparatuses connect to each other, which will be discussed later on with reference to the emission of other exploring signals. The radio section variability indicators are not shown in FIGS. 2a and 2b in order to provide a simpler representation of the routing table.

In addition to the data mentioned in the above points d): g), the first response signal may also contain other data, which will be discussed later on in the description of the example.

If no first responding apparatuses respond within a time $T_E$ to the first first-level exploring signal, then the alarmed apparatus issues a second set of exploring commands addressed to the exploring apparatuses of the second exploring step, which have been selected based on the results of the first exploring step, and/or also to other exploring apparatuses that had previously been excluded, and, if necessary, reiterates said issue at intervals $T_E$ up to $N_E$ times. Every time the exploring signals of the same level are re-issued, the variable N that counts the number of said issues is incremented.

In the case of the example of FIG. 1, it is however assumed that the alarmed apparatus receives at least one response to the first-level exploring signal; more particularly, it is assumed that a response comes from the two responding apparatuses 104 and 108 and that neither one of said two apparatuses can communicate with a PSAP. After receiving said responses, the alarmed apparatus stores into a routing table the data acquired from the information contained in the responses issued by the responding apparatuses. The data contained in said routing table are indicatively shown in the representation of FIG. 2a, which shows in sequence the forms taken by said table in various evolution steps of the transmission process, in particular depending on the data collected after receiving the responses to the i-th-level exploring signals, indicated in Roman numbers on the left of said representation.

The columns labelled "Routes" list the sequence of the identification codes of the apparatuses that define the route taken into account in the respective row. When an exploring signal is first issued, the routing sequences or chains contain of course only one apparatus, and there are no transit apparatuses.

The next columns are labelled "Radio section attenuations", and indicate the estimated attenuations undergone by the signals on the single radio sections, possibly computed by taking into account, as aforesaid, the data relating to both transmission directions. In the case of the example provided herein, the alarmed apparatus computes a 95 dB attenuation on the section that connects the alarmed apparatus 101 to the responding apparatus 104, and a 96 dB attenuation on the section that connects the alarmed apparatus 101 to the responding apparatus 108.

The column labelled "Reliability" indicates the degree of reliability at which the signals travel the route. In this explanatory example, the degree of reliability and the quality of the radio sections, which will be discussed below, are indicated by numeric values between 0 and 10. It is however clear that such indications may also be represented otherwise and on different scales. Taking into account said attenuations of the radio sections and the quality levels at which the alarmed apparatus has received the signals from the responding apparatuses, the alarmed apparatus computes a reliability value of 9 for both sections connecting it to the responding apparatuses 104 and 108.

The next column, labelled "Delay", indicates the time taken by the signals to travel the route from the alarmed apparatus to the last apparatus indicated in the row. Said delay is computed by the alarmed apparatus on the basis of the time elapsed between the issue of a given exploring command, in this case the first-level exploring command, and the reception by the alarmed apparatus of the response to said exploring command sent by the responding apparatus located in the last place of the row of the route for which the delay is being computed.

The columns labelled "Radio section quality" show indicators of the quality of the single radio sections connected on one side to the corresponding cooperating apparatus and on the other side to the apparatus that precedes that cooperating apparatus in the routing sequence or chain. In the case of the present example, the radio sections are those that connect the alarmed apparatus to the first responding apparatuses, i.e. the sections 102 and 103 of FIG. 1. The quality of said two sections is evaluated by the alarmed apparatus 101.

The quality of each radio section may possibly be estimated by the responding apparatus to which the radio section is connected, said estimate being included in the response signal transmitted by that responding apparatus. In this case, said indicators of the quality of the single radio sections and said degree of reliability take also into account said quality estimates made by the responding apparatuses.

Other columns follow, which contain auxiliary data, including, by way of non-exhaustive and non-limiting example, the type of each cooperating apparatus (cellular apparatus, Wi-Fi access point, cordless telephone, PC, etc.) in the row of the apparatuses of the corresponding route, and the speed at which they are moving. Finally, there may be other data, among which the variability of the radio section attenuations, the types of reception/transmission systems with which the apparatuses are equipped, the position of the apparatuses, etc.

If there are any first responding apparatuses, and there are any apparatuses among them which are capable of communicating with a public telecommunications network, said apparatuses capable of communicating with said public network will forward said alarm signal to said PSAP and will notify the alarmed apparatus that the alarm has been forwarded to the PSAP. If there are no apparatuses capable of communicating with an emergency network among the apparatuses responding to said first-level exploring signal, as in the example being illustrated herein, the alarmed apparatus will issue at least one of a set of ad hoc exploring commands, which may be defined as second-level exploring commands, to at least one of said apparatuses, for having it issue in its turn, acting as an exploring apparatus, a second-level exploring signal.

The alarmed apparatus can issue a specific exploring command to each selected exploring apparatus, because it knows the path to be followed for delivering the command to the addressee thanks to the data collected in the routing table during the preceding step. These data may be entered into the command itself, so that any transit apparatuses can identify those exploring commands that must be forwarded by them and can ignore those that must be forwarded by other transit (cooperating) apparatuses. This allows minimizing the number of transmissions performed in order to deliver the exploring commands to the exploring apparatuses. The same virtuous mechanism for limiting the number of transmissions is also effective upon the backward propagation of the responses given by the responding apparatuses to the exploring apparatuses, which responses must be forwarded to the alarmed apparatus by any transit apparatuses possibly employed.

Some non-exhaustive and non-limiting criteria for selecting the apparatuses to be appointed as exploring apparatuses are:
quality of the radio sections (signal level, signal-to-noise ratio, probability of errors when decoding the information);
time elapsed between the issue of a given exploring signal and the arrival of the respective response.

There are also some subordinate preference criteria. For example, if the alarmed apparatus is equipped with means for connecting to an emergency network, but it is not in such conditions that allow it to access the latter, preference will be given to apparatuses whose signals have a quality higher than a preset threshold and have undergone the highest attenuation along the propagation path. This criterion gives higher priority to those apparatuses which, from the electromagnetic standpoint, are farther away and are therefore more likely to be in different reception/transmission conditions than the alarmed apparatus unable to find an accessible network.

In the case of the example illustrated herein, when examining the routing table of FIG. 2a, corresponding to the issue of the first-level exploring signal by the alarmed apparatus, no decisive elements emerge which may give preference to either one of the two apparatuses, and therefore the alarmed apparatus will assign the role as an exploring apparatus to both apparatuses 104 and 108.

If the number of candidates for the issue of a second exploring signal were large, in order to avoid involving an excessive number of apparatuses in the process for transmitting said alarm and propagating an excessive, and perhaps useless, number of exploring commands and signals, as well as of any responses thereto, the alarmed apparatus may nevertheless prevent some first responding apparatuses from issuing said second exploring signal depending on factors which may even be of little importance (e.g.: maximum number of exploring apparatuses of a certain level to be used) or even by random selection.

In the example illustrated herein, the second-level exploring signal issued by the apparatus 104 (FIG. 1) is responded to by the apparatuses 106, 108 and 116, while the second-level exploring signal issued by the apparatus 108 is responded to by the apparatuses 104, 116 and 120. The alarmed apparatus 101 will not respond, in that it recognizes to be the very apparatus that generated the alarm signal, as indicated in the appropriate field of the exploring signal.

The responses to these second-level exploring signals are forwarded to said alarmed apparatus along with the data listed in the above points d): g), respectively through the transit apparatuses 104 and 108. These second-level responses therefore comprise the identifiers of the second-level responding apparatuses 104, 106, 108, 116 and 120, and may contain information about the routes to follow for reaching them. The alarmed apparatus then updates the routing table, shown in the rows corresponding to the "IInd Issue" of FIG. 2a, on the basis of the data contained in the second-level responses received. As can be seen in this table, none of the six routes thus obtained ends at a PSAP.

From the power ratios between the transmission levels of the responding apparatuses, indicated by the data of point g), and the corresponding reception levels measured by the exploring apparatuses, and from any similar power ratios that, in the opposite direction of transmission, the responding apparatuses compute and transmit to the exploring apparatuses as previously explained, the exploring apparatuses compute and send to the alarmed apparatus the attenuations of the radio sections (see FIG. 2a) thanks to the cooperation offered by the transit apparatuses, which forward to the alarmed apparatus the responses of the responding apparatuses.

In this explanatory example, it is assumed that, together with the data corresponding to said list d): g), the alarmed apparatus also receives data relating to the reception quality of the signals responding to the exploring signals. Furthermore, the alarmed apparatus itself may evaluate the quality of the alarmed_apparatus-exploring_apparatus sections and the time interval elapsed between the issue of the exploring command and the reception by the alarmed apparatus of the response to said exploring command from the responding apparatus. With said data, the alarmed apparatus can estimate the reliability of the routing chains.

The exploring apparatuses may also evaluate the single delays of the exploring_apparatus-responding_apparatus sections and then send them, along with the other aforementioned data (apparatus type, speed of movement, attenuation variability, etc.) related to the last responding apparatuses, to the transit apparatuses, which will then forward them to the alarmed apparatus.

After having received and processed said data, the alarmed apparatus updates the table as shown in FIG. 2a, in the rows labelled "IInd issue".

After having analyzed said data corresponding to said IInd issue, the alarmed apparatus discards the route 104-108 because it leads to the apparatus 108, which is already arrived at directly from the alarmed apparatus. In the table of FIG. 2a, an eliminated route is indicated by way of example through the letter "X".

Likewise, the alarmed apparatus also eliminates the route 108-104.

The routes 104-116 and 108-116 lead to the same apparatus 116, but the route 104-116 has lower quality levels and longer delays resulting in lower reliability, hence it is eliminated.

As to the three remaining routes, there are no decisive elements for discarding any one of them. Since none of said remaining routes ends into a PSAP, the alarmed apparatus issues a set of third ad hoc exploring commands addressed to each one of the three extreme apparatuses of said remaining routes.

For the third-level exploring step, the explorer role is assigned to the three apparatuses 106, 116 and 120, while the apparatuses 104 and 108 act as transit apparatuses.

Then the alarmed apparatus commands the apparatus 106, through the apparatus 104, and the apparatuses 116 and 120, through the apparatus 108, to act as exploring apparatuses and to issue third-level exploring signals.

The apparatus 106 is responded to by the apparatuses 111 and 119 (FIG. 1), and the apparatus 116 is responded to by the apparatuses 119 and 124, while the apparatus 120 obtains no response within the preset time.

The responding apparatus 124 has a connection to a public telecommunications network 126 and, through said network, to a PSAP 127; as such, the responding apparatus 124 can be defined a posteriori as a terminal cooperating apparatus for the transmission of the alarm signal. It forwards said alarm coming from said alarmed apparatus to said PSAP: the PSAP 127 itself and/or the responding apparatus 124 may also send to the alarmed apparatus 101, preferably through the same routing chain previously created as described above, a signal indicating that the alarm has been delivered to the PSAP 127. At this point, the alarm transmission process may end, since a route has been found, which in FIG. 1 is composed of the connections 102-113-121-125, drawn with a continuous line, which leads to a PSAP, and since said alarm has been forwarded to a PSAP. However, it is advantageous that the alarmed apparatus updates the routing table, both for better characterizing the route ending at said PSAP in view of a possible reuse thereof for sending said information signal, and for having available all the data relating to the other routes in view of a possible repechage thereof, should the route ending at the PSAP be insufficiently reliable or become unavailable due to a radio section thereof going down.

In addition to considering the responses to said third-level exploring signals, as was done for the responses to the second-level exploring signals, now one must also take into account the fact that the responses to said third-level exploring signals arrive at the alarmed apparatus through the transit apparatuses 104 and 108.

In fact, the apparatuses 104 and 108 possibly update, and send to the alarmed apparatus, the attenuations and the delays of the sections 105 and 121 (FIG. 1) that connect them to the third-level exploring apparatuses.

In a way similar to that regarding the responses to said second-level exploring signals, the alarmed apparatus processes the data it receives and fills in the routing table, which is of the same type as the one composed of the rows of the "IIIrd issue" in FIG. 2a.

By proceeding in the same manner as for the second-level exploring signals, the alarmed apparatus eliminates the route 108-120 because it stops after the apparatus 120, and eliminates the route 108-116-119 because it leads to the apparatus 119 just like the route 104-106-119, but with less reliability.

As regards the two routes (104-106-111, 104-106-119) remaining in addition to the one that includes the apparatuses 108-116-124, there are no reasons for discarding either one of them, and therefore they are kept stored in said routing table for a possible future use thereof, as will be explained below.

The conditions of radio channels are in fact variable over time, so that it may happen that one or more connections of the routes taken into account in said routing table becomes no longer available. Such a new condition of the radio sections may arise, for example, when exchanging messages relating to a new exploring command or when transmitting said information signal. In such a case, the routing table will be updated coherently with the new situation, and the process will be resumed with the analysis of the newly created situation. In a limit case, the process may be resumed with the issue of a new first-level exploring command by the alarmed apparatus. Possibly, the alarmed apparatus may store in the routing table all the examined routes, including the discarded ones, so as to be able to retrieve and reuse all the acquired information. In the case of the above-described explanatory example, the routing table containing all the information acquired during the process for transmitting said alarm takes the form represented in FIG. 2b.

For example, should the route 108-116-124-PSAP not be reliable enough, the process would continue by sending fourth-level exploring signals, resulting in the definition of the route 104-106-111-122-PSAP (see FIG. 1).

On the contrary, if following the issue of an exploring signal the alarm arrives at a PSAP through two or more routes simultaneously, by processing the responses and the data acquired therewith the alarmed apparatus can choose the best route for any subsequent communications, holding the other alternative in the routing table as possible replacements for the main route.

If within a time $T_E$ from the issue of a first set of exploring commands of a certain level, addressed to a first set of exploring apparatuses, said alarmed apparatus receives no response in relation to said first set of exploring commands, then said alarmed apparatus will issue a second set of exploring commands towards a second set of exploring apparatuses. Said second set of exploring apparatuses may be either the same as said first set of exploring apparatuses or a different one; in particular, it may include new exploring apparatuses. If no apparatuses respond, the transmission of the sets of exploring commands of a certain level will be reiterated $N_E$ times, after which, if still no responses are received, the alarm transmission process will end. In such a case of process termination, the alarmed apparatus will emit an alert indicating that said alarm has not been transmitted.

The process may end without said alarm being transmitted, and with said transmission failure alert, also if a time $t_a$ longer than $T_A$ elapses since the process was started without reaching any PSAP.

Figure 3:
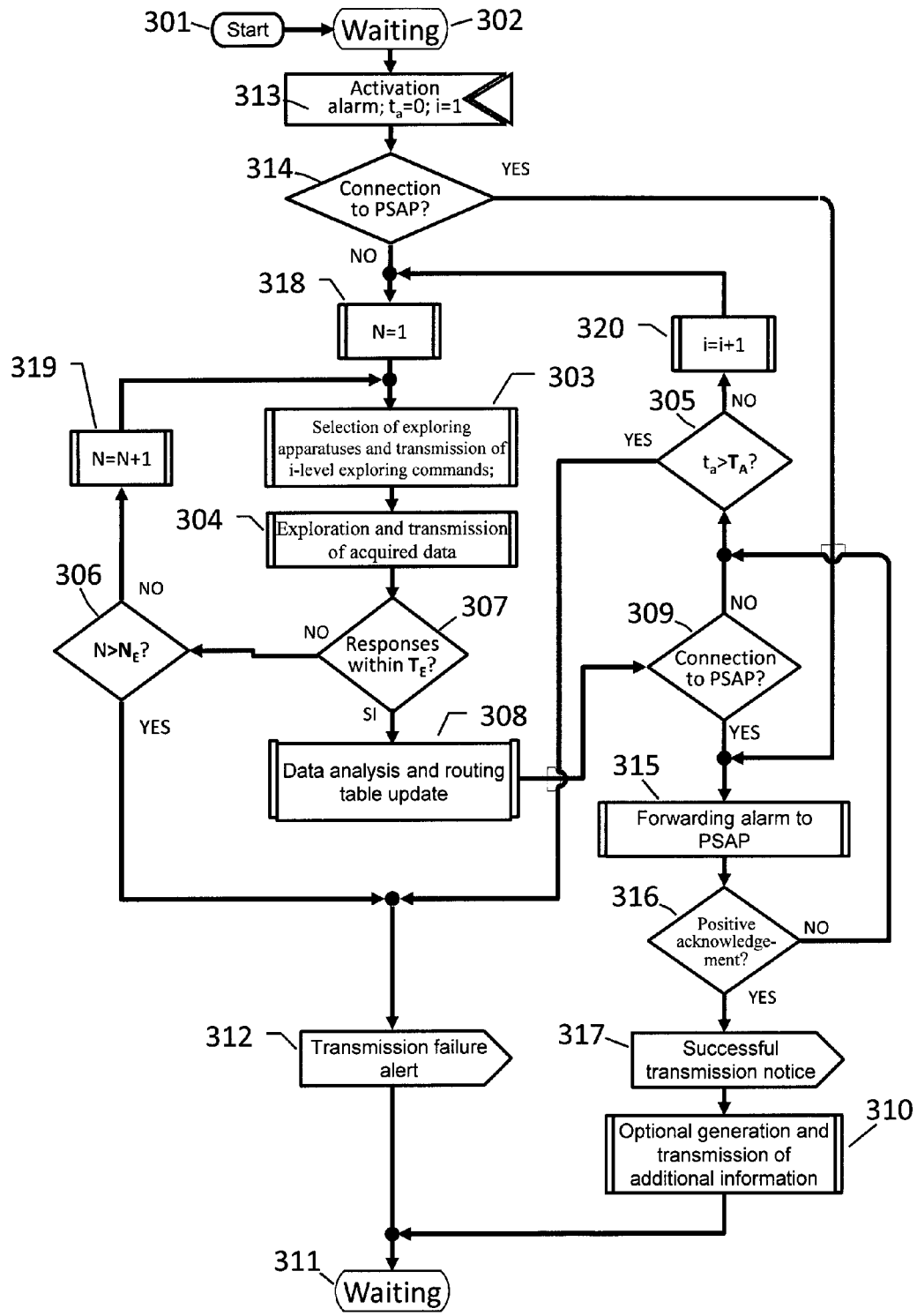
FIG. 3 is a flow chart showing the steps of the alarm transmission process according to the present invention.

The alarm transmission process according to the present invention is described more generally in the flow chart shown in FIG. 3: after the steps of starting 301 and waiting 302 for the alarm activation, the process comprises a step 313 of alarm activation, e.g. by manual or automatic activation of one or more switches or actuators present in the apparatus, or possibly by dialling and calling an emergency telephone number; during said step 313 a mechanism is activated for measuring the time elapsed since the alarm was activated, e.g. by resetting a specific time variable $t_a$. The next step 314 verifies if the alarmed apparatus can connect directly to the PSAP: in the affirmative case, the process provides for transmitting the alarm (step 315) directly to the PSAP; in the negative case, the process comprises a step 303 wherein the exploring apparatus, according to the previously described criteria, chooses the set of apparatuses to which to assign the role as exploring apparatuses and transmits thereto the respective exploring command through appropriate routes included in the routing table. On the first assignment, as previously described, the explorer role is given to the alarmed apparatus itself, whereas all further assignments give the explorer role to a set of apparatuses comprising at least one apparatus.

As can be inferred from the above description of the process, every issue of an i-th-level exploring command by the alarmed apparatus induces the emission of a corresponding (i-th-level) exploring signal by an exploring apparatus (selected on the basis of the results of the preceding exploring steps), where i is an integer number greater than or equal to 1. As a particular case, in the first step the only exploring apparatus selected is the alarmed apparatus itself.

Once the exploring command has been received, the process according to the present invention comprises an exploring step 304 wherein the exploring apparatuses issue their own exploring signal with the above-described characteristics, and remain waiting for any responses (for simplicity, this waiting state is not indicated in FIG. 3). Upon reception of responses from apparatuses that picked up said exploring signals, the exploring apparatuses collect the data that can be acquired from said responses and, after possibly adding data of their own, transmit the data to the alarmed apparatus.

It should be reminded that, as aforesaid, both the transmission of the exploring commands from the alarmed apparatus to the exploring apparatuses and the transmission of data from the exploring apparatuses to the alarmed apparatus may take place by means of a direct radio connection or by means of multiple radio connections going through transit apparatuses. These coordinated flows of commands and data from centre to periphery and vice versa are made possible by the presence, in suitable information fields of the messages, of the routing information previously described, which allow all the cooperating apparatuses involved in their propagation to understand whether they are final or intermediate addressees and, in this latter case, to actuate the retransmission of commands and data as required by the present process. When transit apparatuses are gone through, the transit apparatuses may add information of their own to the information for which they act as repeaters.

The steps that make up the generic i-th step repeated by an apparatus adapted to implement the process according to the present invention can be synthetically summarized as follows:

1) choosing the i-level exploring apparatuses based on the results of the preceding exploring level;
2) transmitting i-level exploring commands to the exploring apparatuses chosen in step 1) and inducing them to radiate i-level exploring signals;
3) receiving responses to the i-level exploring signals and updating the routing table according to said responses.

Since the emission of the exploring signal, the alarmed apparatus 101 remains waiting for responses (for simplicity, also this waiting state is not indicated in FIG. 3). If the alarmed apparatus receives no responses within the time $T_E$ (step 307), then the alarmed apparatus verifies (step 306) if exploring commands of that level had already been issued more than $N_E$ consecutive times. In the affirmative case, the process according to the present invention comprises the step 312 of issuing an alert for unsuccessful transmission of the alarm signal, and the step 311 of ending the process by returning to the initial state as non-alarmed apparatus, waiting for a new alarm activation.

If on the contrary it turns out from the check made at step 306 that the exploring commands of a certain level (and hence the corresponding exploring signals) have not been issued more than $N_E$ times, then the alarmed apparatus will increment by 1 the counter N that counts the reiterations of the emissions of commands of that level (step 319) and will return to the selection of a set of exploring apparatuses to be commanded to issue their own exploring signal, still of the same level, according to the criteria and modalities described herein.

Referring back to step 307, if the alarmed apparatus receives any responses to the exploring commands within the time $T_E$, the process according to the present invention comprises the step wherein the alarmed apparatus analyzes the acquired data, updates the routing table (step 308), and verifies (step 309) if the responses include any responses indicating that a connection to the PSAP has been established: the process then comprises the step 315 of forwarding the alarm to the PSAP through the established connection. Said step 315 may comprise a series of successive attempts at transmitting the alarm to the PSAP, followed by a suitable time awaiting a reception acknowledgement therefrom, e.g. by sending, possibly several times, a suitable SMS message created ad hoc by the mobile terminal 124 starting from the data received from the alarmed apparatus 101. In the subsequent step 316 it is verified if said forwarding has been done successfully. In the affirmative case, the process comprises the step 317 of notifying the alarmed apparatus about the successful delivery of the alarm to the PSAP, and the step of generating (step 310) any supplementary data (e.g. position data) and possibly transmitting additional information to the PSAP, as previously mentioned. The process may possibly also comprise the step (not shown in FIG. 3) of verifying the successful transmission of the supplementary data to the PSAP.

If in step 309 it turns out that the connection to the PSAP has not been established, and if in step 316 it turns out that said alarm has not been forwarded to any PSAP, then the process comprises the step wherein the alarmed terminal verifies (step 305) if a time longer than $T_A$ has elapsed since the start of the process for transmitting said alarm. In the affirmative case, the process comprises the step of issuing an alert (step 312) for unsuccessful transmission of the alarm signal and of ending the process (step 311) by returning, after resetting the alarm status, to the initial state awaiting a new alarm activation.

If on the contrary said time limit $T_A$ has not been exceeded, then the process will go back to step 303 for a further exploring cycle, after having possibly updated the exploring level count variable.

The alarmed apparatus according to the present invention, which is adapted to allow implementation of the above-described process according to the present invention, is therefore equipped with reception/transmission systems allowing direct peer-to-peer connections to be established between apparatuses. Transmission systems offering this performance include, for example, those using technology known as "Wi-Fi Direct", "Peer-to-Peer Wi-Fi" and "P2P Wi-Fi", those using technology known as DECT, those using technology known as Bluetooth, those using technology known as ZigBee, or anyway those using any present or future radio technology that allows peer-to-peer radio frequency communications between terminals. This list of transmission technologies is neither limiting nor exhaustive, especially if we consider that the evolution of mobile communications systems may offer many other technologies in the future, possibly developed ad hoc or derivable, with small modifications, from other widespread technologies with very large potential markets, such as the TDD technologies of cellular systems.

For issuing the exploring signals and transmitting the messages required for implementing the process of the present invention, it is necessary to provide such transmission systems with the protocols needed for implementing the functionalities described herein. Those skilled in the art know that such protocols can be created through simple software applications.

In order to implement the process of the present invention, it is not necessary that all apparatuses use the same radio reception/transmission system. In fact, it is sufficient that they can establish bidirectional communications between pairs of apparatuses, and therefore it is sufficient that the apparatuses have, in pairs, one same reception/transmission system, so long as there are apparatuses equipped with means acting as an interface between apparatuses using different transmission systems. For example, if a first set of apparatuses uses the P2P Wi-Fi reception/transmission system, and a second set of apparatuses uses the ZigBee system, any apparatus belonging to said first set can interconnect to any apparatus belonging to said second set if there is at least one apparatus equipped with both P2P Wi-Fi and ZigBee.

In the routing chain carrying the alarm signal to the apparatuses appointed as exploring apparatuses, each transit apparatus may possibly add its own identifier (e.g. its own telephone number, or its own IP address, or its own MAC address) to the information it forwards in the direction ending at the exploring apparatus; likewise, each exploring apparatus adds its own identifier to the radiated exploring signal, so that the signal eventually reaching a PSAP will also contain data allowing said PSAP to contact, if necessary, also the apparatuses through which said alarm message came, knowing the order in which said apparatuses were gone through. This contact may occur right away, e.g. through the very same routing chain, or subsequently through a communication channel that may also differ from the one extemporaneously established in order to forward the alarm signalling (e.g. the cellular radio mobile network, when one of the apparatuses gone through can be reached again via said network).

As an alternative, the identifiers of the transit apparatuses and of the exploring apparatuses are added to said information signal transmitted after said alarm. The addition of said identifiers to the exploring signal allows said PSAP to receive more quickly the identifiers of the apparatuses in the routing table, whereas said alternative minimizes the information content of the exploring signals and facilitates the reception thereof.

The data acquired from the responses to the exploring signals are preferably transmitted to the alarmed apparatus within radio signals containing data acquired from single responses. As an alternative, single radio signals may contain data relating to more than one response, if data relating to different responses arrive at the exploring apparatuses or at the transit apparatuses within time windows smaller than a preset limit. In any case, the data acquired from the responses are correlated with the respective exploring signals.

In a first embodiment, the maximum interval $T_E$ between successive repetitions of a set of exploring commands of the same level is preset and constant for each exploring level. In a second embodiment, the interval $T_E$ is dynamically adapted on the basis of the results of the preceding exploring levels. Some non-exhaustive and non-limiting examples of criteria on which the choice of the value $T_E$ may be based are:
time elapsed between issues of exploring commands and reception of the corresponding responses by the alarmed apparatus (minimum, mean, maximum time, . . . );
number of exploring apparatuses of the current exploring level; quality of the radio channels;
degree of variability of the radio channels.

In the explanatory example described herein, upon issue of the second-level exploring signal the apparatus 116 responds to both the apparatus 104 and the apparatus 108 (FIG. 1). If, for example, because of said double engagement of the apparatus 116, or because of particular states in which the apparatus 116 may be, the response of the apparatus 116 to the apparatus 104 arrives with much delay, it may happen that the response of the apparatus 116 arrives at the apparatus 104 after the apparatus 104 has already received, from the apparatus 106, the response of other apparatuses to the third-level exploring signal issued by the apparatus 111. In order to correlate the data acquired from the response signals responding to the respective exploring signals, the exploring signals are identified by an identification code (see point c) of the description) which may, for example, be correlated with the exploring step, and the response signals will indicate the identification code of the exploring signal to which the response is referring (see point e) of the description).

In the event that an exploring apparatus is equipped with more than one reception/transmission system, in a first alternative embodiment said exploring apparatus radiates said exploring signal by using only that reception/transmission system through which it received the command to issue said exploring signal. In a second alternative embodiment, said exploring apparatus radiates said exploring signal also through reception/transmission systems other than the one through which it received the command to issue said exploring signal. This second alternative embodiment widens the group of apparatuses eligible for being included in the set of cooperating apparatuses.

As a final step of the emergency signalling that generated the alarm, after having found the route between the alarmed apparatus and a PSAP and having sent the first alarm signalling, an additional step may be started to determine the position of the alarmed apparatus and transmit it to said PSAP. The data of said position are then sent to the PSAP through the route found during the process according to the present invention.

If the reception/transmission systems used by the alarmed apparatus and by all the apparatuses in the routing chain that connects the alarmed apparatus to the PSAP also allow establishing voice connections between apparatuses, a connection is established through said routing chain to put the alarmed apparatus in voice communication with the PSAP.

The present invention allows reducing the percentage of cases wherein an alarm signal cannot be sent out quickly due to the impossibility of gaining access to public telecommunications networks, as it may occur in closed premises, elevators, garages, impervious areas not served by cellular networks, etc., or due to local out-of-service events of public networks caused, for example, by fires, floods, natural calamities or other disastrous events. In fact, it is very likely that the palm terminals owned by most of the world population, and by almost the whole population of developed countries, have within the range of their reception/transmission systems other apparatuses equipped with at least one reception/transmission system with which they can establish a connection, at least for the transmission of short data messages. The software applications implementing the process described herein allow transmission of alarm signals to a PSAP from apparatuses which are not in such conditions as to be able to connect to a public telecommunications network, thereby significantly extending the reach of safety services to places which cannot be permanently or temporarily be served by public telecommunications networks.

Furthermore, in accordance with the present invention it is possible to forward an alarm signal through radio sections compliant with various technologies (e.g. ZigBee, Bluetooth, TDD, Wi-Fi, DECT), in that it is completely independent of the latter. It may therefore happen that the radio sections belonging to a routing chain of FIG. 1 are implemented by using wholly different radio systems, thus exploiting the increasing use of several different radio systems (Wi-Fi, Bluetooth, Wi-Max, DECT, etc.) which are more and more often built in the same apparatus.

Finally, the alarmed apparatus monitors the entire cooperative propagation of the alarm signal, thus avoiding the transmission of useless or too many signals or commands, which is typical of cooperative communication systems. The exploring signals are the only radio signals in the process which are issued "blindly", i.e. without a predefined target, and that might therefore cause an indeterminate number of response transmissions. However, they are issued upon a specific command generated by the alarmed apparatus, which coordinates the emission of said signals on the basis of specific criteria set beforehand, thus being able to limit the number of said signals and to define general exploring strategies.

The invention claimed is:

1. A process for transmitting at least one alarm signal from an alarmed apparatus to a PSAP, or Public Safety Answering Point, through a system composed of a plurality of cooperating apparatuses, the alarmed apparatus included in the plurality of cooperating apparatuses, said apparatuses being equipped at least with memory means, processing means and a first radio system for direct reception/transmission, from apparatus to apparatus, of signals and data, wherein at least one apparatus included in the plurality of cooperating apparatuses is equipped with means for transmitting said alarm signal to said PSAP, the process comprising the steps of:
 a) embedding said alarm signal into at least one exploring signal radiated in the first instance from said alarmed apparatus through said first radio system, wherein said exploring signal induces acknowledgement responses from the apparatuses picking up said exploring signal, regardless of whether the alarmed apparatus is aware a priori of the presence or the existence of said apparatuses picking up said exploring signal, said first radio system being configured to receive said acknowledgement responses, and said apparatuses picking up said exploring signal being eligible for, based on said acknowledgement responses, being added to said plurality of cooperating apparatuses;
 b) having at least one of said cooperating apparatuses which may have received said exploring signal receive and transmit said exploring signal such that said exploring signal is received and transmitted from cooperating apparatus to cooperating apparatus until at least one of said cooperating apparatuses that have directly or indirectly received said exploring signal transmits said alarm signal to said PSAP through said means for transmitting said alarm signal to said PSAP, wherein said exploring signal is re-transmitted by at least one selected cooperating apparatus upon receiving a command issued by said alarmed apparatus, wherein said at least one selected cooperating apparatus is selected depending on acknowledgments transmitted by said cooperating apparatuses to said alarmed apparatus about a result of a reception of said exploring signal by at least one of said cooperating apparatuses and about a result of a tentative re-transmission of said alarm signal to said PSAP.

2. The process for transmitting an alarm signal according to claim 1, the further comprising the steps of:
 c) selecting a group of exploring apparatuses comprising at least one apparatus of said plurality of cooperating apparatuses that has received said exploring signal;
 d) identifying in the first instance said group of exploring apparatuses by means of said alarmed apparatus, said alarmed apparatus acting, in said first instance, both as an alarmed apparatus and as an exploring apparatus;
 e) transmitting, from said alarmed apparatus to said exploring apparatuses, whether directly or indirectly by means of radio hops through other apparatuses of said set of cooperating apparatuses acting as transit apparatuses, a command for issuing said exploring signal containing at least said alarm signal;
 f) issuing said exploring signal by each apparatus of said group of exploring apparatuses;
 g) receiving said exploring signal by a group of responding apparatuses belonging to said plurality of cooperating apparatuses, said responding apparatuses being within a respective radio reception/transmission range;

h) transmitting said alarm signal to said PSAP by the apparatuses of said group of responding apparatuses that can establish at least one connection with said PSAP.

3. The process for transmitting an alarm signal according to claim 2, further comprising the steps of:

i) transmitting a signal in response to said exploring signals, by each one of said responding apparatuses, which contains at least one identification code, a transmission power value of said response signal and a forward indication of said alarm signal, said forward indication signalling whether said respective responding apparatus has forwarded or not said alarm signal to said PSAP;

j) respectively receiving, by said apparatus of said group of exploring apparatuses, said signals in response to said exploring signals;

k) respectively acquiring, by said apparatus of said group of exploring apparatuses, data relating to said received response signals, said data comprising, for said received response signal, at least said identification code, said forward indication and said transmission power value contained in said response signals;

l) computing, respectively by said apparatus of said group of exploring apparatuses, at least one estimate of a reception quality of said received response signal and an estimate of the section attenuation undergone by said received response signal, and respectively measuring, by said apparatus of said group of exploring apparatuses, a power value of the corresponding received signal;

m) transmitting to said alarmed apparatus, by each apparatus of said group of exploring apparatuses, said data relating to said response signals;

n) receiving, by said alarmed apparatus, said data relating to said response signals, processing said data and estimating, based on said data, a degree of reliability of each route that a signal transmitted by said alarmed apparatus can travel, and storing said processed data into a routing table;

o) evaluating, by said alarmed apparatus, on the basis of said data stored in said routing table, whether a transmission of said alarm to said PSAP has occurred or not;

p) if said transmission of said alarm to said PSAP has not occurred, redefining said group of exploring apparatuses and reiterating the steps preceding said transmission by starting from said step e), said group of exploring apparatuses being redefined at least on the basis of said degree of reliability of said routes, whereas if said transmission of said alarm to said PSAP has occurred, ending said transmission of said alarm.

4. The process according to claim 3, wherein said section attenuation estimate is computed as a ratio between said transmission power of each response signal, whose value is contained in said response signal, and the reception power of the same response signal, measured by said apparatus of said group of exploring apparatuses that has received the same response signal.

5. The process according to claim 3, wherein said alarmed apparatus is equipped with at least one counter (N) configured to count the number of consecutive times that the same command for issuing said exploring signal has been given and wherein, during said transmission of said alarm signal, after said transmission in said step e) of said command for issuing said exploring signal, said alarmed apparatus remains waiting for receiving said data relating to said response signals for a maximum time equal to $T_E$, and wherein, if said time $T_E$ elapses without any of said data being received, said alarmed apparatus computes whether said command for issuing said exploring signal has already been given or has not yet been given more than $N_E$ times, and in that it comprises the steps wherein:

q) said alarmed apparatus ends said transmission and issues an alert for unsuccessful transmission of said alarm, if said command has already been issued more than $N_E$ times;

r) said alarmed apparatus reiterates the steps of said transmission by starting from said step e), if said command has not yet been issued more than $N_E$ times.

6. The process according to claim 5, wherein said step r) comprises the substep wherein said alarmed apparatus, before reiterating said transmission by starting from said step e), redefines said group of exploring apparatuses at least on the basis of said degree of reliability of said routes, so that said group of exploring apparatuses takes a different composition than the current one.

7. The process according to claim 3, wherein said step p) comprises a substep wherein, if said transmission of said alarm to said PSAP has not occurred, said alarmed apparatus verifies whether a time longer than $T_A$ has elapsed or not since said transmission was started, and in that it comprises the steps wherein:

s) said alarmed apparatus ends said transmission and issues an alert for unsuccessful transmission of said alarm, if a time longer than $T_A$ has elapsed since said transmission was started;

t) said alarmed apparatus redefines said group of exploring apparatuses and reiterates an execution of said transmission from said step e), if a time longer than $T_A$ has not elapsed since said transmission was started, said group of exploring apparatuses being redefined at least on the basis of said degree of reliability of said routes.

8. The process according to claim 3, wherein said step p) comprises the substep wherein, after said transmission of said alarm signal in said step e), said alarmed apparatus transmits to said PSAP an information signal containing data relating to the position of said alarmed apparatus.

9. The process according to claim 3, further comprising the step of recording into said routing table said estimates of the reception quality of said response signals and of said section attenuations together with the respective instants to which said estimates refer.

10. The process according to claim 3, further comprising the step wherein said degree of reliability of said routes is computed by taking into account said quality estimates made by said responding apparatuses.

11. The process according to claim 3, further comprising the step wherein said alarmed apparatus estimates the variability of the radio sections present in said routes by comparing the characteristics of said radio sections detected at different time instants and by referring the differences between said characteristics to the differences between the respective time instants to which said characteristics are related.

12. The process according to claim 11, further comprising the step wherein said degree of reliability of said routes is computed by also taking into account said variability of the radio sections included in said routes.

13. The process according to claim 2, further comprising the step wherein said responding apparatuses estimate a quality of the radio section through which they respectively receive said exploring signal, and wherein said quality estimates are included in said data relating to said response signals issued by said respective responding apparatuses.

14. The process according to claim 2, further comprising the step wherein said responding apparatuses estimate the attenuation introduced by the radio section through which they respectively receive said exploring signal, and wherein said section attenuation estimates are included in said data relating to said response signals issued by said respective responding apparatuses.

15. The process according to claim 2, further comprising the step wherein said exploring apparatuses equipped with said first radio system are equipped with at least one second radio system and issue said exploring signal through at least said first and second radio systems, and activate the reception of said response signals in all the radio systems used for issuing said exploring signal.

16. The process according to claim 2, further comprising the step wherein said apparatuses of said set of cooperating apparatuses equipped with said first radio system are equipped with a second radio system and transmit signals to a given apparatus of said plurality of cooperating apparatuses by using the radio system through which they have received signals from said given cooperating apparatus.

17. The process according to claim 1, further comprising the step of transmitting to said PSAP also identification codes of all said cooperating apparatuses through which said alarm signal flows in transit from said alarmed apparatus to said PSAP, with an indication of the order in which said cooperating apparatuses are gone through.

18. The process according to claim 1, wherein said exploring signal also contains an indication of the power level at which said exploring signal is being transmitted.

19. The process according to claim 1, further comprising the step wherein said alarmed apparatus estimates the routing time taken by a message to travel along a routing chain, on the basis of the time elapsed between the transmission of said command for issuing an exploring signal and the arrival at said alarmed apparatus of said data relating to said response signals pertaining to said command.

20. The process according to claim 19, further comprising the step wherein said alarmed apparatus estimates the degree of reliability of a routing chain by also taking into account said routing time.

21. An apparatus further comprising:
 memory means;
 processing means; and
 at least one first radio system for direct reception/transmission of signals and data with another apparatus;
 the memory means, processing means, and the at least one first radio system configured to perform the process according to claim 1.

22. The apparatus according to claim 21, further comprising means for transmitting said alarm signal to said PSAP.

23. The apparatus according to claim 21, the processing means configured to estimate a power of signals picked up by said first radio system and estimate a quality of said signals.

24. The apparatus according to claim 21, the at least one first radio system configured to establish a voice service connection to said PSAP.

25. The apparatus according to claim 21, wherein said at least first radio system uses technology known as "Wi-Fi Direct", "Peer-to-Peer Wi-Fi" or "P2P Wi-Fi", or technology known as DECT, or technology known as Bluetooth, or technology known as ZigBee, or radio access technologies of the TDD (Time Division Duplex) type.

* * * * *